Figure 1:
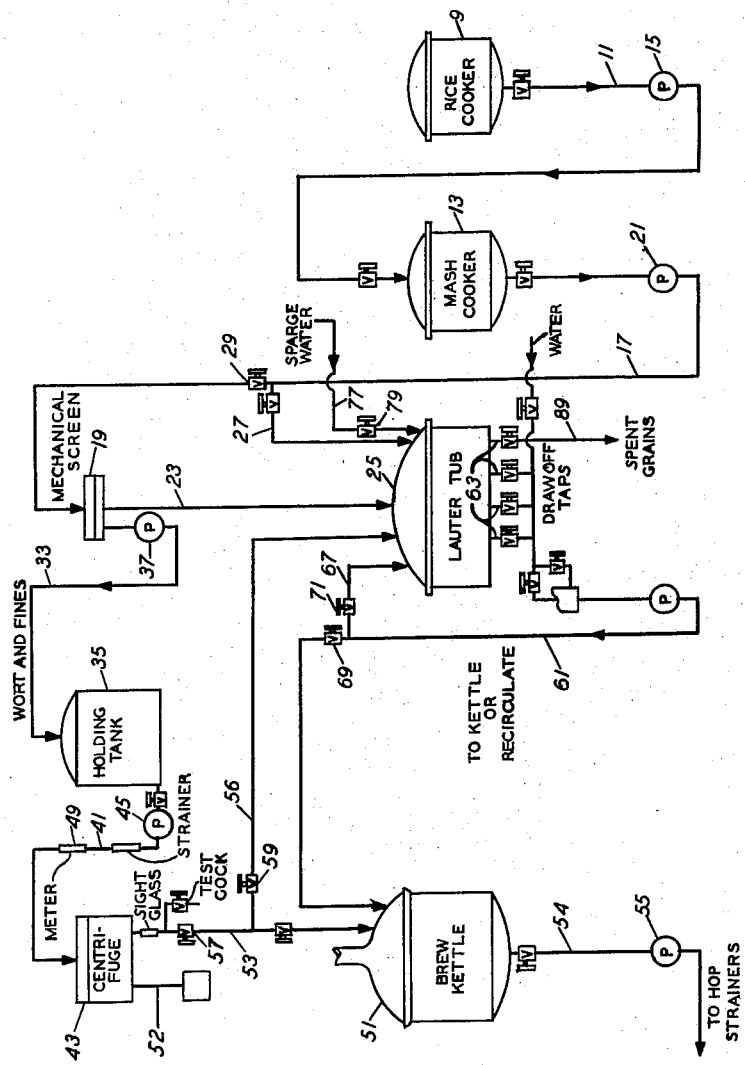

INVENTOR.
HAROLD HOWARD ROHRBECK
BY
Buckhorn and Cheatham
ATTORNEYS

2,847,309
BREWING PROCESS

Harold Howard Rohrbeck, Olympia, Wash., assignor to Olympia Brewing Company, Olympia, Wash., a corporation of Washington Application May 21, 1956, Serial No. 586,087

6 Claims. (Cl. 99—52)

This invention relates to a brewing process and apparatus.

Heretofore, in the conventional brewing process, it has taken considerable time to filter the wort through the filtering bed provided by the grain in the lauter tub and also to sparge the bed. I believe the reason for this is that the fines, which are microscopic glutinous protein matter, have collected in the interstices of the filtering bed and have restricted and even completely closed them thus slowing down the filtering step.

It is a main object of the present invention to provide a brewing process overcoming the above disadvantage.

A further object of the present invention is to provide a process in which all or part of the fines are removed from the mash prior to the mash entering the lauter tub whereby to speed up the filtering operation.

A further object of the present invention is to provide an apparatus by which the method of the present invention may be carried out.

The process of the present invention is characterized by the steps of separating the fines from at least a part of the mash prior to the mash being conducted to the lauter tub so that the filter bed is not nearly as congested or restricted by the presence of the fines as heretofore has been the case and thus the filtering action of the bed is much more rapid than heretofore.

Various other objects of the present invention will be apparent from the following description taken in connection with the accompanying drawing wherein the single figure is a schematic diagram of an apparatus of the present invention and by which the process of the invention may be carried out.

The apparatus disclosed includes a cereal cooker 9 which is connected by a pipe 11 to a mash cooker 13, a suitable pump 15 being provided to pump cooked rice from the rice cooker to the mash cooker. The mash cooker is connected by a pipe 17 to a mechanical screen 19, a suitable pump 21 being provided in this pipe. The mechanical screen functions to separate the grains from the wort and fines, and a conduit 23 connects the screen to a lauter tub 25 for conducting grains from the screen to the lauter tub. A branch pipe 27 connects pipe 17 to the lauter tub 25, and suitable valves 29 and 31 are provided in pipes 17 and 27, respectively, to permit a desired division of flow of the mash from the mash cooker to the screen and to the lauter tub.

A pipe 33 connects the screen to a holding tank 35 and serves to conduct wort and fines to the holding tank, a suitable pump 37 being provided for causing the flow. A pipe 41 connects the holding tank to a centrifuge 43, a suitable pump 45 being provided in this pipe. A strainer 47 and a flow meter 49 may also be provided. The centrifuge functions to separate the fines from wort, and the wort is conducted from the centrifuge to a brew kettle 51 by a pipe 53 by means of gravity flow. The spent fines are conducted away from the centrifuge by a conduit 52.

A pipe 54 conducts brewed wort from the kettle to hop strainers, not shown.

A branch pipe 56 connects pipe 53 to the top of the lauter tub 25, and suitable valves 57 and 59 are provided in pipes 53 and 55, respectively, to permit the wort leaving the centrifuge to optionally be conducted to the brew kettle or to the lauter tub 25. The bottom of the lauter tub is connected to the brew kettle by a pipe 61, a plurality of draw taps 63 connecting pipe 61 to the lauter tub. A branch pipe 67 connects pipe 61 to the lauter tub and suitable valves 69 and 71 are provided to enable wort leaving the lauter tub to be recirculated through the tub or conducted to the brew kettle. A pipe 77 is provided for conducting sparging water to the lauter tub 25, a suitable control valve 79 being provided in this pipe. A conduit 89 extends from the lauter tub and serves to conduct spent grains away from the tub to a dumping station.

The process of the invention is as follows. Mash from the cooker 13 is conducted through the pipe 17 and a part of the mash is conducted to the mechanical screen 19 and a part is conducted to the lauter tub, this being regulated by the valves 29 and 31. A mechanical screen 19 operates on the portion of the mash received and separates the grains from the wort and fines, the grains being conducted by the chute line 23 to the lauter tub where the grains form a filtering bed. It will be appreciated that these screened grains carry a portion of the wort with them. The bed thus formed is augmented by the grains of the mash entering the tub through branch pipe 27, and the bed commences to filter the wort which is conducted to the lauter tub through the branch pipe 27 as a component of the mash conducted through this pipe. The wort and fines separated out by the mechanical screen 19 are conducted through the pipe 33 to the holding tank and therefrom through the pipe 41 to the centrifuge 43. The centrifuge functions to separate substantially all of the fines from the wort, the separated fines being conducted through the conduit 52 to a suitable discharge vat. The wort, however, is conducted through pipe 53 to the brew kettle 51, if it is of prescribed clarity, or, if not, it is conducted through the pipe 56 to the lauter tub 25 where it is filtered by the filtering bed. It will be appreciated that the filtering bed formed in the lautering tub will have the interstices thereof much less constricted and restricted than is the case were the entire mash batch conducted to the lauter tub. It will be appreciated that all of the grains in the mash leaving the cooker 13 are conducted to the lauter tub, and thus a filtering bed of the same size as in conventional process is provided. In fact, under certain circumstances the entire contents leaving the cooker 13 may pass through the lauter tub. This may readily take place if the wort leaving the centrifuge 43 is not of prescribed clarity and has to be conducted to the lauter tub. It is further pointed out that if the wort leaving the lauter tub is not of prescribed clarity it must be recirculated through the lauter tub 25 via pipe 67. Assuming that the wort leaving the lauter tub 25 is of prescribed clarity, it is conducted to the brew kettle 51.

By the process of the present invention, the time normally required for filtering the wort through the lauter tub is substantially decreased. It has been discovered that under normal conditions of the time required for filtering the wort through the filter bed, when only a portion of the fines have been removed from the wort, is less than required for screening and centrifuging the entire body of mash. Thus, in most instances, it will be desirable to screen and centrifuge the wort and fines of only part of the mash in order to effect the greatest saving in time.

The centrifuge 43 may be of various types, including the basket type, in which case the fines would cling to the walls of the basket, or may be of the continuous centrifugal separator type, in which case the fines are the heavy effluent and come out as sludge. Also various types of filtering devices may be substituted for the centrifuge, with or without filter aids.

Having described the invention in what is considered to be the preferred embodiment thereof, it is desired that it be understood that the invention is not to be limited other than by the provisions of the following claims.

I claim:

1. A brewing apparatus, comprising a mash cooker in which malt and cereals may be cooked into a mash comprising wort and grain and fines in intermixed relation, a lauter tub, means for conducting one part of the mash produced by the mash cooker to the lauter tub, said lauter tub being operable to form a filter bed of the grains of said one part of said mash and to filter wort through such bed, separating means, means for conducting the remainder of said mash from the mash cooker to said separating means, said separating means being operable to separate at least part of the wort and fines of said remainder from the grains of said remainder, means for conducting grains which are separated by said separating means to said lauter tub where they are added to the filtering bed, a centrifuge means, means for conducting wort and fines separated out by said separating means from said separating means to said centrifuge means, said centrifuge means being operable to separate at least a part of the fines from the wort, a brew kettle for brewing wort, means for conducting wort from said centrifuge means to said brew kettle, and means for conducting filtered wort from said lauter tub to said brew kettle.

2. A brewing apparatus, comprising a mash cooker in which malt and cereals may be cooked into a mash comprising wort and grain and fines in intermixed relation, a lauter tub, means for conducting one part of the mash produced by the mash cooker to the lauter tub, said lauter tub being operable to form a filter bed of the grains of said one part of said mash and to filter wort through such bed, separating means, means for conducting the remainder of said mash from the mash cooker to said separating means, said separating means being operable to separate at least part of the wort and fines of said remainder from the grains of said remainder, means for conducting grains which are separated by said separating means to said lauter tub where they are added to the filtering bed, a centrifuge means, means for conducting wort and fines separated out by said separating means from said separating means to said centrifuge means, said centrifuge means being operable to separate at least a part of the fines from the wort, a brew kettle for brewing wort, means for conducting wort from said centrifuge means to said brew kettle, means for conducting filtered wort from said lauter tub to said brew kettle, and means for conducting wort from said centrifuge to said lauter tub so that when said wort is not of predetermined clarity it may be conducted to the lauter tub to be filtered through said filtering bed rather than being conducted directly from said centrifuge means to said brew kettle.

3. The process of handling the mash produced from mashing ground malt and unground cereals wherein the mash comprises wort and grains and fines, comprising separating one part of the mash from the remainder and forming a filtering bed from the grains of said one part, separating at least part of the fines from the grains of said remainder and adding the just-mentioned grains to such bed, and filtering through such bed at least the wort from said one part of said mash.

4. The process of handling the mash produced from mashing ground malt and unground cereals wherein the mash comprises wort and grains and fines, comprising separating one part of the mash from the remainder and forming a filtering bed from the grains of said one part, separating at least part of the fines from the grains of said remainder and adding the just-mentioned grains to such bed, and filtering through such bed at least the wort from said one part of said mash and also the wort of said remainder when the latter is not of predetermined clarity.

5. The process of handling the mash produced from mashing ground malt and unground cereals wherein the mash comprises wort and grains and fines, comprising separating one part of the mash from the remainder and forming a filtering bed from the grains of said one part, separating at least part of the wort and fines from the grains of said remainder and adding the just-mentioned grains to such bed, separating at least part of the fines from the wort of said remainder and filtering the just-mentioned wort and the wort of said one part of said mash through said bed.

6. The process of handling the mash produced from mashing ground malt and unground cereals wherein the mash comprises wort and grains and fines, comprising separating one part of the mash from the remainder and forming a filtering bed from the grains of said one part, separating substantially all of the wort and fines from the grains of said remainder and adding the just-mentioned grains to such bed, separating substantially all the fines from the wort of said remainder and filtering through said bed the wort of said one part of said mash and also the wort of said remainder when the latter is not of predetermined clarity.

References Cited in the file of this patent

UNITED STATES PATENTS

| | | |
|---|---|---|
| 1,920,461 | Clark | Aug. 1, 1933 |
| 2,513,687 | Strezynski | July 4, 1950 |
| 2,726,957 | Kunz | Dec. 13, 1955 |